July 24, 1956 P. T. VICKERS 2,755,999
TEMPERATURE MEASURING AND CONTROL APPARATUS
Filed May 17, 1952
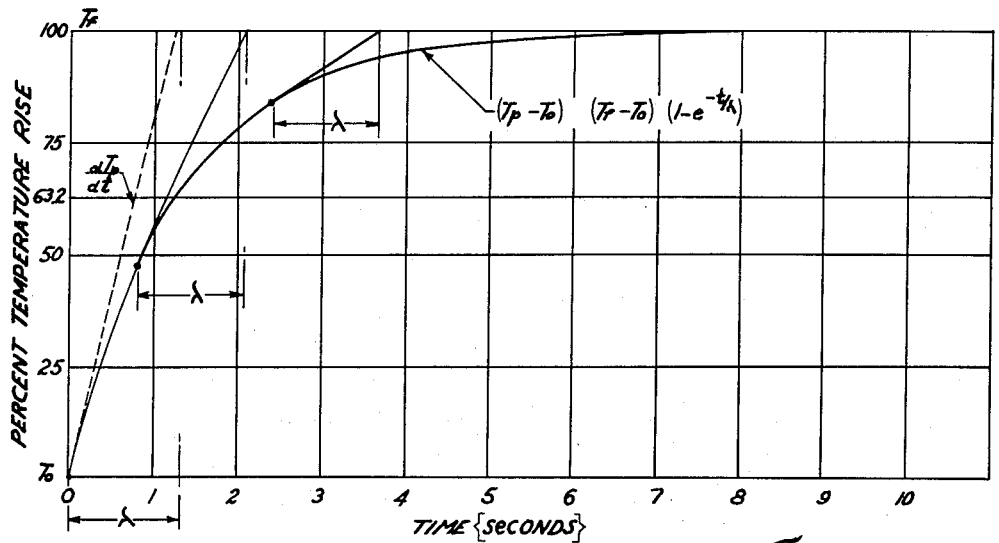
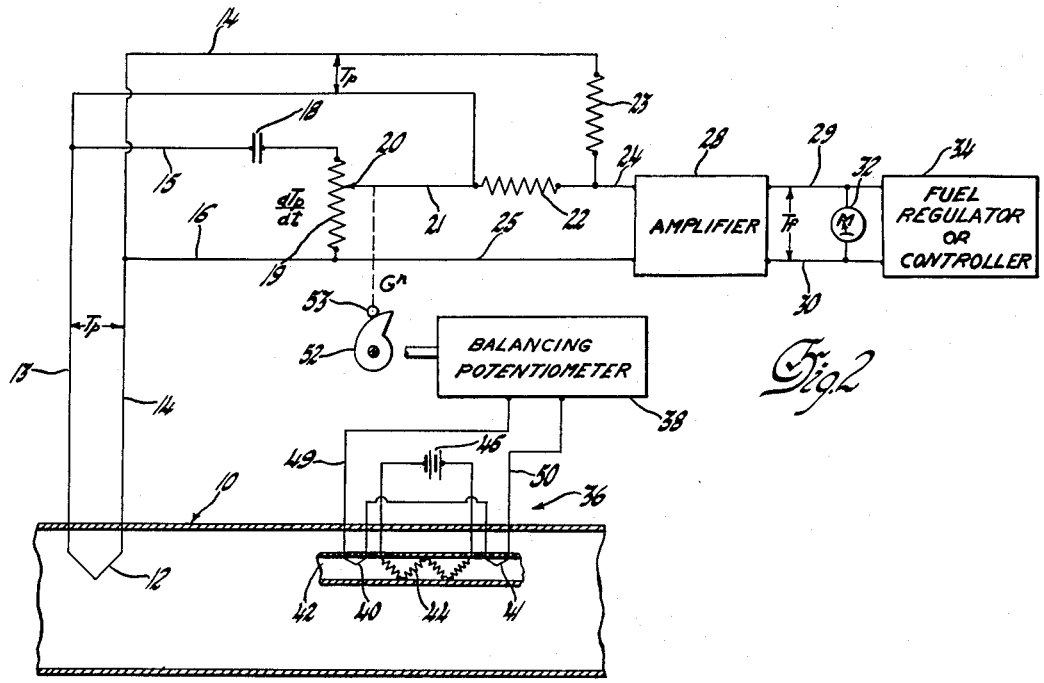
INVENTOR.
Paul T. Vickers
BY
Willits Helmig & Baillio

United States Patent Office 2,755,999
Patented July 24, 1956

2,755,999

TEMPERATURE MEASURING AND CONTROL APPARATUS

Paul T. Vickers, Royal Oak, Mich., assignor to General Motors Corporation, Detroit, Mich., a corporation of Delaware Application May 17, 1952, Serial No. 288,572

6 Claims. (Cl. 236—69)

My invention relates to temperature sensing apparatus for measuring and indicating or controlling the temperature of a moving gas stream and, more particularly, to such apparatus instantaneously responsive to sudden changes in temperature of a high velocity gas stream as in gas turbines or jet engines, for example.

It is highly desirable that the temperature sensing and control apparatus employed in jet engines, for example, be instantaneously responsive to sudden changes in temperature as the engine is subjected to different operating conditions. Due to the inherent heat inertia of temperature sensing elements, such as thermocouples, resistance pyrometers, thermistors, and the like, available for such measurements, the temperature of the probe will lag any change in the temperature of the gas stream in which it is immersed. As a result, critically stressed parts in the engine may be damaged by prolonged exposure to excessive temperatures before the temperature controller has been actuated to reduce the temperature to a safe value.

Experimental investigations of the response characteristics of temperature sensing elements indicate that the thermal lag characteristic of a temperature probe is a function of the physical dimensions and thermal properties thereof and also of the density and velocity of the gas stream. In order to insure accurate and reliable temperature measurements, it is therefore necessary that the effect of changes in the flow rate of the gas on the thermometric or characteristic lag of the temperature probe be taken into consideration.

The present invention thus has for its general objective the provision of temperature sensing apparatus that is instantaneously responsive to sudden changes in temperature of a moving gas stream, notwithstanding the thermometric lag of the temperature sensing element employed therein, and contemplates correcting for the effects of changes in the flow rate of the gas stream on the characteristic lag of the temperature probe so as to obtain a more accurate and dependable indication of the actual temperature of a moving gas stream than has been heretofore obtained.

The preferred manner in which the above and other objects of the present invention are realized, together with the attending features and advantages thereof, will appear more fully from the following detailed description and drawings, wherein: Fig. 1 is a graphical representation of the thermal response characteristic of a temperature sensing probe immersed in a moving gas stream, and Fig. 2 is a schematic electrical representation of temperature sensing apparatus in accordance with a preferred embodiment of the invention for use in a temperature control system.

Referring to the drawings, Fig. 1 represents the response characteristic of a temperature probe subjected to a sudden increase in temperature and can be expressed by the following equation:

$$(T_p - T_0) = (T_f - T_0)(1 - e^{-t/\lambda}) \tag{1}$$

where $T_p$ = temperature of the probe at any time "$t$"
$T_0$ = initial probe temperature
$T_f$ = final probe temperature
$e$ = base of natural logarithms
$t$ = elapsed itme
$\lambda$ = characteristic time or lag coefficient in seconds.

The characteristic time, lambda ($\lambda$), the time required for the probe to reach $(1-1/e)$ or 63.2% of its total temperature change, depends upon the mass, surface area, conductivity, and specific heat of the probe and upon the density and velocity of the gas stream. For a given probe, the characteristic time varies only with changes in the forced convection to the probe and is dependent on the mass velocity (G) of the gas and can be expressed as $$\lambda = KG^n \tag{2}$$

where K and $n$ are constants depending upon the particular thermocouple which can be determined therefor by experiment. Mass velocity G is the product of density in lb./ft.$^3$ by velocity in ft./sec. and has the dimensions lb./ft.$^2$ sec.

From Fig. 1 it will appear that the temperature lag $(T_f - T_p)$ of the probe at any time is equal to the slope $$\frac{dT_p}{dt}$$

of the response curve at that time multiplied by the characteristic time $\lambda$, from which the following relationship can be derived for the final temperature $T_f$ attained by the probe:

$$T_f = \lambda \cdot \frac{dT_p}{dt} + T_p \tag{3}$$

The above relationship can be verified mathematically by differentiating $T_p$ with respect to $t$ in Equation 1 and substituting the value of $e^{-t/\lambda}$ from Equation 1 in the resulting differential equation to eliminate $e^{-t/\lambda}$. Thus, for any given probe, the slope of the characteristic curve is directly related to the magnitude of the total change in temperature, as the characteristic response time $\lambda$ for any given probe with constant mass velocity G is constant. However, in order to measure accurately the total temperature change to which the probe is subjected when the temperature change is accompanied with a change in the flow rate of the gas stream, a correction must be made for the effect of changes in the flow rate on the characteristic time $\lambda$ of the probe.

Substituting in Equation 3 the value of $\lambda$ from Equation 2 we have $$T_f = KG^n \frac{dT_p}{dt} + T_p \tag{4}$$

This is the equation which is solved by the apparatus embodying the invention so that $T_f$ rather than $T_p$ is determined by the apparatus, thereby eliminating the undesirable lag of conventional temperature-measuring devices.

Fig. 2 is a schematic electrical diagram of temperature sensing apparatus in accordance with the invention for measuring and controlling the temperature of a high velocity gas stream flowing through a conduit 10, which may be the turbine exhaust duct of a jet engine, for example, and comprises a temperature sensing element 12, a differentiating circuit comprising a condenser 18 and resistance 19, a voltage divider arrangement comprising a load resistor 22 and a voltage dropping resistor 23, a conventional D. C. amplifier 28, an indicating instrument 32 such as a galvanometer, and a conventional fuel regulator or controller 34.

Referring to the operation of the apparatus of Fig. 2, the temperature sensing element 12, which may be a thermocouple probe, for example, is immersed in the gas stream and develops a unidirectional voltage between the terminals thereof which is proportional to the instantaneous temperature $T_P$ of the probe. Under steady state operating conditions, the temperature of the probe will be substantially the same as that of the stream and a constant E. M. F. will be developed between the terminals thereof. When the probe is subjected to a sudden change in temperature, its output will increase or decrease, depending upon the direction of the temperature change, in accordance with the response characteristic of the probe. Since Equation 4 is applicable for transient cooling conditions as well as for transient heating conditions, the response of the probe when subjected to a sudden decrease of temperature will be exactly complementary to that shown in Figure 1.

The output of the thermocouple probe 12 is applied to the series connected resistances 22, 23 over lines 13, 14 and to the differentiating circuit formed by the series combination of the condenser 18 and resistor 19 over lines 15, 16 which are connected to lines 13, 14. A variable arm or contact 20 adjustable along the length of resistor 19 is connected through line 21 to one terminal of the load resistance 22, the other terminal of which is connected to one of the input terminals of the amplifier 28 through line 24. The other input terminal of the amplifier 28 is connected directly through line 25 to the terminal of resistor 19 remote from condenser 18. The output of the amplifier 28 is connected through lines 29, 30 to the galvanometer indicating device 32 and to the fuel regulator 34.

The voltage appearing across the resistor 19 of the differentiating circuit is proportional to the time rate of temperature change $$\frac{dT_p}{dt}$$

of the probe, which, under steady state operating conditions, will be zero, while the voltage appearing across load resistance 22 will be proportional to the instantaneous temperature of the probe $T_p$. Load resistor 22 is so connected in circuit with the output of the differentiating circuit that the voltage applied to the input of the amplifier 28 will be equal to the sum of the voltage drop across load resistance 22 and that part of the voltage drop across resistor 19 appearing between lines 21 and 25. The total voltage at the input of the amplifier will then be proportional to the instantaneous temperature $T_p$ of the probe at time $t$ modified in accordance with the time rate of temperature change of the probe when the temperature of the stream is suddenly changed from $T_p$ to $T_f$, for example. Under those conditions where the flow rate of the stream remains unchanged, the characteristic time $\lambda$ for the probe is constant, and the amplitude of the signal indicated by the galvanometer 32 will be directly proportional to the total temperature of the stream. The apparatus thus instantaneously predicts what the final temperature $T_f$ of the probe will be should conditions remain the same as they are at that instant, notwithstanding the fact that the probe has not attained that temperature.

The effects of changes in the flow rate of the characteristic time lag of the thermocouple are accounted for by a velocity sensing device 36 and a self-balancing potentiometer 38 which are provided in the apparatus of Fig. 2. The velocity sensing device 36 may be a hot wire anemometer, Pitot tube or any other instrument producing a signal indicative of the mass velocity or flow rate of the stream. By way of example, an anemometer type device suitable for use herein comprises a pair of spaced thermocouples 40, 41 inserted in a tube 42 in the path of the gas stream. Intermediate the thermocouples 40, 41 in the tube 42 is an electrical heating element 44 which is connected to a constant source 46 of D. C. potential. The anemometer serves to measure the temperature difference between the two probes as affected by changes in the rate of flow of a definite quantity of gas through the tube 42. The thermocouples are connected in opposed series relation and develop a signal proportional to the flow rate of the stream which signal is applied over the leads 49, 50 to the self-balancing potentiometer 38.

The self-balancing potentiometer 38 employed herein may be similar to the Brown potentiometer manufactured by the Brown Instrument Co., of Philadelphia, Pa. and serves to translate the electrical signal applied thereto into a mechanical displacement, the sense and magnitude of which is proportional to that of the input signal. The potentiometer 38 regulates the angular position of an exponential cam 52 so as to produce a mechanical displacement directly related to the characteristic time $\lambda = KG^n$. The cam 52 drives a follower 53 that is mechanically coupled to the contact or variable arm 20 on the resistance 19. The voltage appearing between lines 21 and 25 will then be proportional to the product of the characteristic time $\lambda$ and the time rate of temperature change $$\frac{dT_p}{dt}$$

of the thermocouple in accordance with the first term of Equation 4 and will be automatically adjusted for changes in the mass velocity of the gas stream. This voltage is then additively combined with the voltage appearing across load resistor 22 and the resulting voltage then applied to the indicating instrument 32 and/or to the fuel regulator 34 through the amplifier 28, as above, as a measure of the total temperature of the stream.

The temperature measuring apparatus thus described can be employed as a safety or temperature limiting control system in a gas turbine or furnace to control rapidly and accurately the temperature at the control point where the temperature probe is located. Should the temperature at the control point begin to change, the fuel supply can be controlled before the temperature probe has reached its final temperature. Control can be maintained at a definite maximum or minimum temperature condition regardless of mass flow or initial temperatures.

The fuel regulator or controller 34 may be any form of control device or modification of existing controllers responsive to the magnitude of the signal applied thereto. It is unnecessary to describe the fuel regulator 34 in detail since the details thereof are immaterial to the invention. Many known fuel regulators for gas turbine engines incorporate valves controlled by the electrical signal from a thermocouple for limiting fuel flow, thereby to maintain the temperature of the motive fluid in the engine at a desired value or to prevent it from exceeding a desired value. The signal from my temperature sensing means can be used in the same way as that from conventional thermocouple systems, with the great advantage of instantaneous response. Instead of employing a single thermocouple with its associated circuit elements to derive two signals, one proportional to the instantaneous temperature of the probe and the other proportional to the time rate of temperature change thereof, a second thermocouple could be employed at the point of control to sense the total temperature of the control position, while the first is used to determine the time rate of temperature change.

While the invention has been described in terms of particular forms of differentiating and multiplying devices, it is apparent that the principles of the invention can be carried out with other forms of electrical as well as mechanical devices without departing from the scope and spirit of this invention.

I claim:

1. Temperature sensing apparatus for instantaneously measuring sudden changes in temperature of a moving gas stream comprising, in combination, temperature sensing means immersed in said gas stream, said temperature sensing means developing a signal proportional to the instantaneous temperature thereof, differentiating means connected to said temperature sensing means differentiating said instantaneous signal with respect to time for obtaining a differentiated signal proportional to the time rate of change of temperature thereof, means including velocity sensing means immersed in said gas stream for developing a signal proportional to the characteristic time $\lambda$ of said temperature sensing means, means for multiplying said differentiated signal with said signal proportional to the characteristic time of said temperature sensing means to obtain a signal proportional to the product thereof, means for additively combining said product signal with said signal proportional to the instantaneous temperature of said temperature sensing means, and utilizing means responsive to the magnitude of the combined signal connected to said last-named means.

2. Temperature sensing means for instantaneously measuring sudden changes in temperature of a moving gas stream comprising, in combination, thermocouple means immersed in said gas stream, said thermocouple means developing an electrical signal proportional to the instantaneous temperature thereof, an electrical differentiating circuit connected to said thermocouple means differentiating with respect to time the signal developed thereby for obtaining a differentiated signal proportional to the time rate of temperature change thereof, means including velocity sensing means immersed in said gas stream for developing an electrical signal proportional to the characteristic time $\lambda$ of said thermocouple means, means for multiplying said differential signal with said signal proportional to the characteristic time of said thermocouple means to obtain a signal proportional to the product thereof, circuit means for additively combining said product signal resulting from said multiplication with the output of said thermocouple means, and means for indicating the magnitude of said combined signal.

3. Temperature sensing means for obtaining instantaneous temperature measurements of a moving gas stream comprising, in combination, thermocouple means immersed in said gas stream, said thermocouple means developing an electric signal proportional to the instantaneous temperature thereof, an electrical differentiating circuit comprising a serially connected reactive and a resistive element connected to said thermocouple means for differentiating with respect to time the signal developed by the thermocouple means, a contact adjustable along the length of said resistive element to form a potentiometer therewith, velocity sensing means immersed in said gas stream for developing an electric signal related to the rate of flow of said stream, potentiometer adjusting means including motor means actuated by said signal from said velocity sensing means for mechanically adjusting the position of said contact on said resistive element in accordance with the sense and magnitude of changes in the flow rate of said gas stream, circuit means connected in circuit with said adjustable contact of said potentiometer and across said thermocouple means for additively combining the output of said thermocouple means with the output of said differentiating circuit appearing between said adjustable contact and the terminal of said potentiometer remote from said reactive element, and utilizing means connected between the terminal of said last-named circuit means remote from said adjustable contact and the terminal of said resistive element remote from said reactive element.

4. Temperature sensing means for instantaneously measuring the temperature of a moving gas stream comprising, in combination, thermocouple means immersed in said gas stream, said thermocouple means developing an electric signal proportional to instantaneous temperature thereof, an electrical differentiating circuit comprising a serially connected reactive and a resistive element connected to receive the output of said thermocouple means for differentiating with respect to time the output of the thermocouple, a contact adjustable along the length of said resistive element, velocity sensing means immersed in said gas stream for developing an electric signal related to the rate of flow of said stream, means for mechanically adjusting the position of said contact on said resistive element in accordance with the sense and magnitude of changes in the flow rate of said gas stream, said means comprising a self-balancing potentiometer connected to receive said signal from said velocity sensing means and an exponential cam and roller driven by said self-balancing potentiometer and coupled to said adjustable contact arm, a load resistor connected in series with said adjustable arm and across said thermocouple means, and indicating means connected between the terminal of said load resistor remote from said adjustable contact and the terminal of said resistive element remote from said reactive element.

5. Apparatus for controlling the temperature of a moving gas stream comprising, in combination, a thermocouple probe immersed in said stream, a time differentiating circuit comprising a condenser and resistor connected in series with said probe, a contact adjustable along the length of said resistor, a hot wire anemometer immersed in said stream, a self-balancing potentiometer connected to said anemometer, an exponential cam and follower driven by said potentiometer and mechanically coupled to said adjustable contact on said resistor, a load resistor connected to said adjustable contact and across said thermocouple probe, amplifying means having an input circuit connected to the terminal of said load resistor remote from said adjustable contact and to the terminal of said resistor remote from said condenser, and fuel regulating means connected to the output of said amplifying means.

6. Temperature sensing apparatus for obtaining instantaneous temperature measurements of a moving gas stream comprising, in combination, temperature sensing means immersed in said gas stream developing a signal proportional to the instantaneous temperature thereof, differentiating means connected to said temperature sensing means differentiating said instantaneous signal with respect to time for obtaining a differentiated signal proportional to the time rate of temperature change thereof, velocity sensing means immersed in said gas stream developing a signal related to the rate of flow of said stream, means for multiplying said differentiated signal with said last named signal to obtain a signal proportional to the product thereof, means additively combining the product signal with said signal proportional to the instantaneous temperature of said temperature sensing means and means for indicating the magnitude of the combined signal.

References Cited in the file of this patent

UNITED STATES PATENTS

| 2,282,726 | Jones | May 12, 1942 |
| 2,573,596 | Offner | Oct. 30, 1951 |
| 2,595,881 | Peterson | May 6, 1952 |